US008516068B2

(12) United States Patent
Brown et al.

(10) Patent No.: US 8,516,068 B2
(45) Date of Patent: *Aug. 20, 2013

(54) SYSTEM AND METHOD FOR PROCESSING MESSAGES BEING COMPOSED BY A USER

(75) Inventors: Michael Kenneth Brown, Fergus (CA); Michael Stephen Brown, Kitchener (CA); Michael Grant Kirkup, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,222

(22) Filed: Aug. 7, 2012

(65) Prior Publication Data

US 2012/0303731 A1 Nov. 29, 2012

Related U.S. Application Data

(63) Continuation of application No. 13/229,865, filed on Sep. 12, 2011, now Pat. No. 8,244,820, which is a continuation of application No. 12/834,326, filed on Jul. 12, 2010, now Pat. No. 8,037,149, which is a continuation of application No. 11/192,116, filed on Jul. 29, 2005, now Pat. No. 7,756,932.

(51) Int. Cl.
*G06F 15/16* (2006.01)

(52) U.S. Cl.
USPC ........... 709/206; 709/238; 713/156; 713/170; 726/5

(58) Field of Classification Search
USPC ..................... 709/206, 238; 726/5; 713/156, 713/170
See application file for complete search history.

(56) References Cited

U.S. PATENT DOCUMENTS

| 4,615,002 | A | 9/1986 | Innes |
| 4,868,877 | A | 9/1989 | Fischer |
| 6,212,553 | B1 | 4/2001 | Lee et al. |
| 6,381,696 | B1 | 4/2002 | Doyle |
| 6,434,601 | B1 * | 8/2002 | Rollins .......................... 709/206 |
| 6,760,752 | B1 | 7/2004 | Liu et al. |
| 6,807,277 | B1 | 10/2004 | Doonan et al. |

(Continued)

FOREIGN PATENT DOCUMENTS

| CA | 2549616 | 1/2007 |
| CA | 2549616 | 2/2010 |

(Continued)

OTHER PUBLICATIONS

United States Final Office Action. Co-pending U.S. Appl. No. 11/418,176. Dated: Feb. 9, 2010.

(Continued)

*Primary Examiner* — Alina N Boutah
(74) *Attorney, Agent, or Firm* — Bereskin and Parr LLP/S.E.N.C.R.L., s.r.l.

(57) ABSTRACT

A system and method for processing messages being composed by a user of a computing device (e.g. a mobile device). Embodiments are described in which the performance of certain tasks is initiated before a direction is received from a user to send a message being composed by the user. This may involve, for example, "pre-fetching" security-related data that will be required in order to send a message that is in the process of being composed by the user securely. Such data may include security policy data, certificate data, and/or certificate status data, for example.

30 Claims, 6 Drawing Sheets

(56) References Cited

U.S. PATENT DOCUMENTS

| | | | |
|---|---|---|---|
| 6,834,277 B1 | 12/2004 | Learmonth | |
| 6,918,042 B1 | 7/2005 | Debry | |
| 6,990,578 B1 | 1/2006 | O'Brien et al. | |
| 7,082,536 B2 | 7/2006 | Filipi-Martin et al. | |
| 7,299,412 B1 | 11/2007 | Hull et al. | |
| 7,353,393 B2* | 4/2008 | Hansen et al. | 713/170 |
| 7,472,349 B1 | 12/2008 | Srivastava et al. | |
| 7,640,427 B2* | 12/2009 | Callas et al. | 713/153 |
| 7,644,274 B1* | 1/2010 | Jakobsson et al. | 713/168 |
| 7,756,932 B2 | 7/2010 | Brown et al. | |
| 7,769,807 B2 | 8/2010 | Childress et al. | |
| 7,809,354 B2 | 10/2010 | Calhoun et al. | |
| 7,886,144 B2 | 2/2011 | Brown et al. | |
| 8,037,149 B2 | 10/2011 | Brown et al. | |
| 8,244,820 B2 | 8/2012 | Brown et al. | |
| 8,335,823 B2* | 12/2012 | Brown et al. | 709/206 |
| 2001/0014156 A1 | 8/2001 | Murakami | |
| 2002/0025046 A1 | 2/2002 | Lin | |
| 2002/0120776 A1* | 8/2002 | Eggebraaten et al. | 709/246 |
| 2003/0105589 A1 | 6/2003 | Liu et al. | |
| 2003/0105821 A1* | 6/2003 | Shah et al. | 709/206 |
| 2003/0147536 A1 | 8/2003 | Andivahis et al. | |
| 2004/0098589 A1* | 5/2004 | Appenzeller et al. | 713/170 |
| 2004/0133774 A1 | 7/2004 | Callas et al. | |
| 2004/0133775 A1* | 7/2004 | Callas et al. | 713/153 |
| 2004/0139163 A1 | 7/2004 | Adams et al. | |
| 2004/0148356 A1 | 7/2004 | Bishop et al. | |
| 2004/0249817 A1* | 12/2004 | Liu et al. | 707/9 |
| 2005/0005118 A1 | 1/2005 | Wheeler et al. | |
| 2005/0010801 A1* | 1/2005 | Spies et al. | 713/200 |
| 2005/0038991 A1 | 2/2005 | Brown et al. | |
| 2005/0071631 A1 | 3/2005 | Langer | |
| 2005/0086477 A1 | 4/2005 | Lin et al. | |
| 2005/0198368 A1* | 9/2005 | Fleming et al. | 709/238 |
| 2005/0210289 A1* | 9/2005 | Brown et al. | 713/201 |
| 2005/0216771 A1* | 9/2005 | Malcolm | 713/201 |
| 2006/0010322 A1* | 1/2006 | Novack et al. | 713/170 |
| 2006/0031309 A1 | 2/2006 | Luoffo et al. | |
| 2006/0031315 A1 | 2/2006 | Fenton et al. | |
| 2006/0031574 A1* | 2/2006 | Simelius | 709/238 |
| 2006/0168012 A1 | 7/2006 | Rose et al. | |
| 2006/0212524 A1 | 9/2006 | Wu et al. | |
| 2007/0005706 A1 | 1/2007 | Branda et al. | |
| 2007/0038704 A1 | 2/2007 | Brown et al. | |
| 2007/0113101 A1 | 5/2007 | LeVasseur et al. | |
| 2007/0260876 A1 | 11/2007 | Brown et al. | |
| 2008/0294726 A1 | 11/2008 | Sidman | |
| 2009/0019123 A1 | 1/2009 | Childress et al. | |
| 2011/0185172 A1 | 7/2011 | Thayer et al. | |
| 2013/0013714 A1* | 1/2013 | Brown et al. | 709/206 |

FOREIGN PATENT DOCUMENTS

| | | |
|---|---|---|
| CN | 1272279 | 11/2000 |
| CN | 1905442 | 1/2007 |
| EP | 1536601 | 6/2005 |
| EP | 1653655 | 5/2006 |
| EP | 1748608 | 1/2007 |
| WO | 99/08429 | 2/1999 |
| WO | 2005015867 | 2/2005 |
| WO | 2005107133 | 11/2005 |

OTHER PUBLICATIONS

Canadian Notice of Allowance. Patent Application No. 2,549,616. Dated: Jun. 10, 2009.
Chinese Second Office Action (English Translation). Application No. 200610092750.1. Dated: Nov. 13, 2009.
Co-pending U.S. Appl. No. 11/418,176, "Method and System for Sending Secure Messages", filed May 5, 2006.
Amendment. Co-pending U.S. Appl. No. 11/418,176. Dated: Nov. 30, 2009.
United States Office Action. Co-pending U.S. Appl. No. 11/418,176. Dated: Jul. 29, 2009.
Chinese First Office Action (English Translation). Application No. 200610092750.1. Dated: Apr. 3, 2009.
Canadian First Office Action. Application No. 2,549,616. Dated: Sep. 24, 2008.
European Communication under Rule 51(4) EPC. Application No. 05107027.4. Dated: May 18, 2007.
Singapore Examination Report. Application No. 200603484-7. Dated: Oct. 3, 2007.
Singapore Written Opinion. Application No. 200603484-7. Dated: Sep. 21, 2006.
European Search Report. Application No. 05107027.4-2416 Dated: Jan. 31, 2006.
Information Technology Services. Tennessee Technological University: "Web Mail Basics" Internet, May 2003, pp. 1-8 XP002362302. URL: http://www.tntech.edu/ITs/pubs/pdf/WebMailBasics.pdf.
http://developer.openwave.com/htmldoc/41/tool/nottools5.htmp; UP.SDK Tools and APIs Reference, Chapter 2: Notifications Utilities, Title: Installing Certificates with Upcerins.
http://developer.openwave.com/htmldoc/41/tool/nottools2.htmp; UP.SDK Tools and APIs Reference, Chapter 2: Notifications Utilities, Title: Requesting Certificates with Certmaker.
Singapore Notification of Grant. Application No. 200603484-7. Dated: Feb. 27, 2009.
Amendment After Final. Co-pending U.S. Appl. No. 11/418,176. Dated: Apr. 20, 2010.
Advisory Action. Co-pending U.S. Appl. No. 11/418,176. Dated: Apr. 30, 2010.
Amendment. Co-pending U.S. Appl. No. 11/418,176. Dated: Jun. 4, 2010.
Request for Continued Examination (RCE). Co-pending U.S. Appl. No. 11/418,176. Jun. 4, 2010.
Office Action. Co-pending U.S. Appl. No. 11/418,176. Dated: Sep. 16, 2010.
Amendment. Co-pending U.S. Appl. No. 11/418,176. Dated: Dec. 9, 2010.
Final Office Action. Co-pending U.S. Appl. No. 11/418,176. Dated: Feb. 8, 2011.
Notice of Abandonment. Co-pending U.S. Appl. No. 11/418,176. Dated: Aug. 26, 2011.
Decision to grant a European patent pursuant to article 97(2) EPC. European Application No. 05107027.4. Dated: Oct. 11, 2007.
Certificate of Invention Patent (with English Translation). Chinese Application No. 200610092750.1. Dated: Sep. 8, 2010.
Response. European Patent Application No. 05107027.4. Dated: Apr. 26, 2006.

* cited by examiner

SYSTEM AND METHOD FOR PROCESSING MESSAGES BEING COMPOSED BY A USER

CROSS REFERENCE TO RELATED APPLICATION

This application is a continuation of U.S. patent application Ser. No. 13/229,865, filed Sep. 12, 2011, which is a continuation of U.S. patent application Ser. No. 12/834,326, filed Jul. 12, 2010, which is a continuation of U.S. patent application Ser. No. 11/192,116, filed Jul. 29, 2005. U.S. patent application Ser. No. 11/192,116 issued to patent as U.S. Pat. No. 7,756,932. U.S. patent application Ser. No. 12/834,326 issued to patent as U.S. Pat. No. 8,037,149. U.S. patent application Ser. No. 13/229,865 issued to patent as U.S. Pat. No. 8,244,820. The entire contents of U.S. patent application Ser. No. 13/229,865, U.S. patent application Ser. No. 12/834,326, and U.S. patent application Ser. No. 11/192,116, are hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the invention relate generally to the processing of messages (e.g. electronic mail messages), and more specifically to systems and methods for processing messages being composed by users of computing devices (e.g. mobile devices).

BACKGROUND OF THE INVENTION

Electronic mail ("e-mail") messages may be generally encoded using one of a number of known protocols to facilitate secure message communication. The Secure Multiple Internet Mail Extensions ("S/MIME") protocol, for example, relies on public and private encryption keys to provide confidentiality and integrity, and on a Public Key Infrastructure (PKI) to communicate information that provides authentication and authorization. Data encoded using a private key of a private key/public key pair can only be decoded using the corresponding public key of the pair, and data encoded using a public key of a private key/public key pair can only be decoded using the corresponding private key of the pair. In S/MIME, the authenticity of public keys used in the encoding of messages may be validated using certificates. Other known standards and protocols may be employed to facilitate secure message communication, such as Pretty Good Privacy™ (PGP) and variants of PGP such as OpenPGP, for example. It is understood that as compared to S/MIME-based systems, PGP-based systems also utilize public and private encryption keys to provide confidentiality and integrity, although the authenticity of public keys used in the encoding of PGP messages are validated in a different manner. Constructs for providing a public key and information on the key holder similar to that of a "certificate" (as used in S/MIME for example) may be provided in such other secure message communication standards and protocols. One such construct is commonly known as a "PGP key" in PGP-based systems. For the purposes of this specification and the claims, the term "certificate" may be deemed to include such constructs.

Generally, before a new e-mail message that has been composed by a user of a computing device can be sent, it may be necessary to retrieve certain data to process the message, including for example: (1) security policy data, which may identify a required security encoding for the message; (2) certificate data, which typically includes a certificate holder's public key and other identification information associated with the certificate holder; and/or (3) certificate status data, which may be used in verifying the status of a certificate (e.g. whether the certificate has been revoked). While an e-mail message is being composed, it is typically in a dynamic state until it is sent. Accordingly, only after the user has finished composing the e-mail message and directed the computing device to send the message (e.g. by selecting a "send" option provided by a messaging application) would the data typically be retrieved and used to further process the message before it is sent. This avoids unnecessary requests for the data, which might be made if the user who is composing a message ultimately decides not to send the message, for example.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Figure 1:
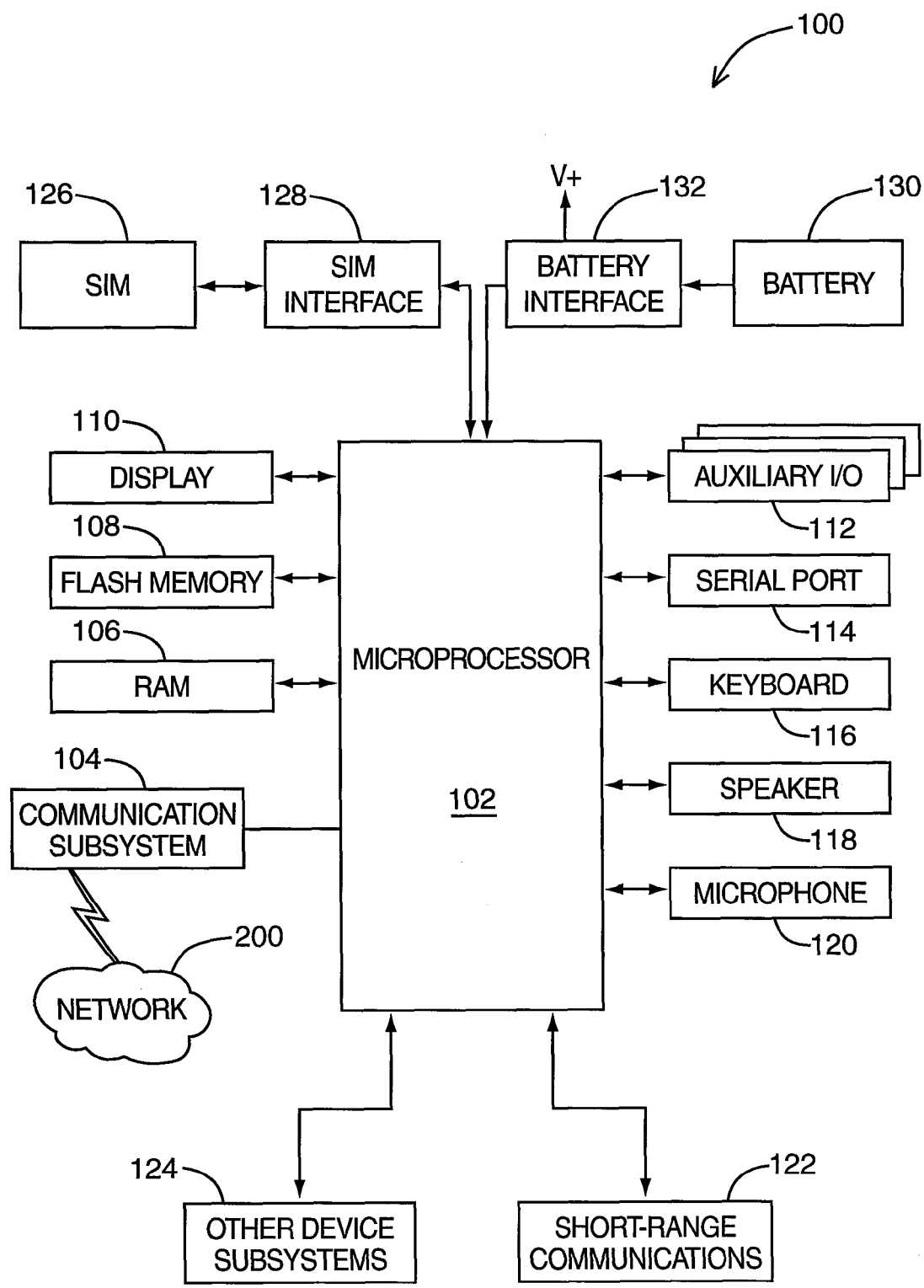
FIG. 1 is a block diagram of a mobile device in one example implementation.

As described in the above example, only after the user has finished composing an e-mail message and directed a computing device to send the message to activate the send process, would data such as security policy data, certificate data, and/or certificate status data generally be retrieved to further process the message. On a typical wired network, the time to complete the necessary requests to retrieve such data is typically minimal, and therefore, the process of obtaining this data in order to facilitate the sending of the message is often transparent to the user. On many wireless networks, however, the time to obtain the required data could be much longer, which may result in a significant delay in the send process as perceived by the user.

In contrast to prior art systems that defer the initiation of the retrieval of such data until after a direction is received from the user to send the message, in order to avoid unnecessary requests for the data, it may nonetheless be desirable to employ a technique in which delays in the send process that might be experienced by users of certain computing devices such as mobile devices may be minimized such that the send process will appear more transparent to such users.

Embodiments described herein relate generally to systems and methods in which the performance of certain tasks is initiated while a user is composing a message and before a direction is received from the user to send the message. This may involve "pre-fetching" data that will likely be required in order to send a message that is in the process of being composed by the user, for example. Initiating the performance of such tasks in advance will generally increase the likelihood that a message will appear to be sent quickly from the user's perspective, as the tasks required to complete the send process might already have been completed, or at the very least, will have already been initiated by the time the direction to send the message is received from the user. This can enhance the usability of a computing device, and may be particularly advantageous when the computing device is a mobile device.

In one broad aspect, there is provided a method of processing messages being composed by a user of a computing device, the method comprising the steps of: receiving a request from a user to compose a message; detecting when at least one triggering event associated with the message being composed by the user has occurred; and for each triggering event, initiating performance of at least one task associated with the respective triggering event while the message is being composed by the user, after detecting the occurrence of the respective triggering event.

In another broad aspect, there is provided a method of processing messages being composed by a user of a computing device, wherein the task associated with at least one triggering event includes retrieving data that would be required to further process the message being composed by the user should the user direct the message to be sent.

In at least one embodiment, the computing device is a mobile device.

These and other aspects and features of various embodiments will be described in greater detail below.

Some embodiments of the systems and methods described herein make reference to a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
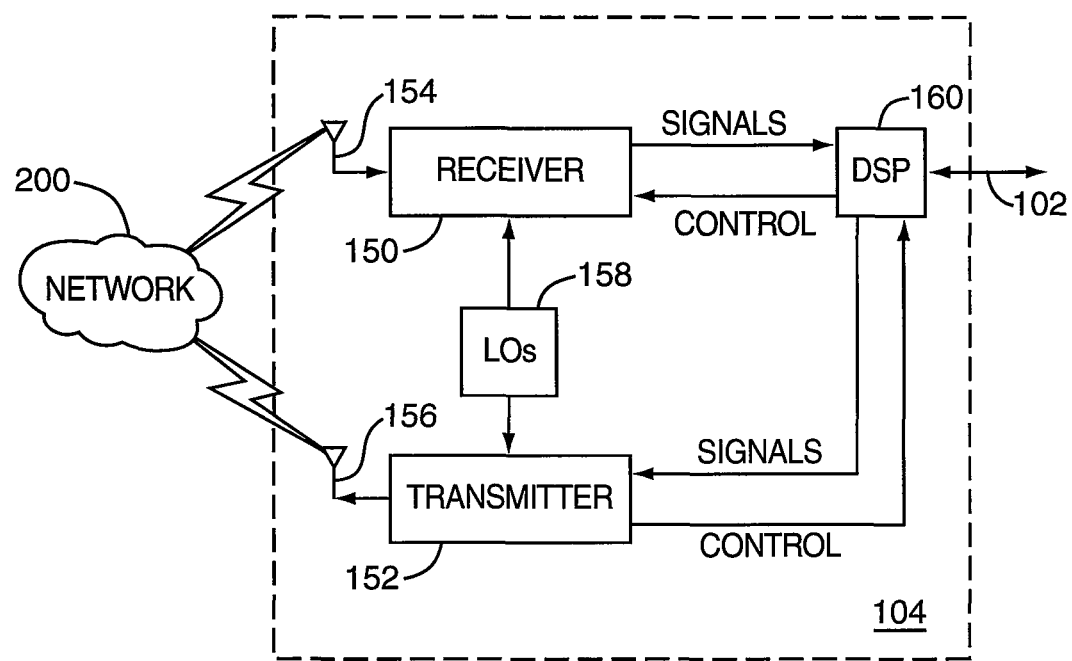
FIG. 2 is a block diagram of a communication subsystem component of the mobile device of FIG. 1.
Figure 3:
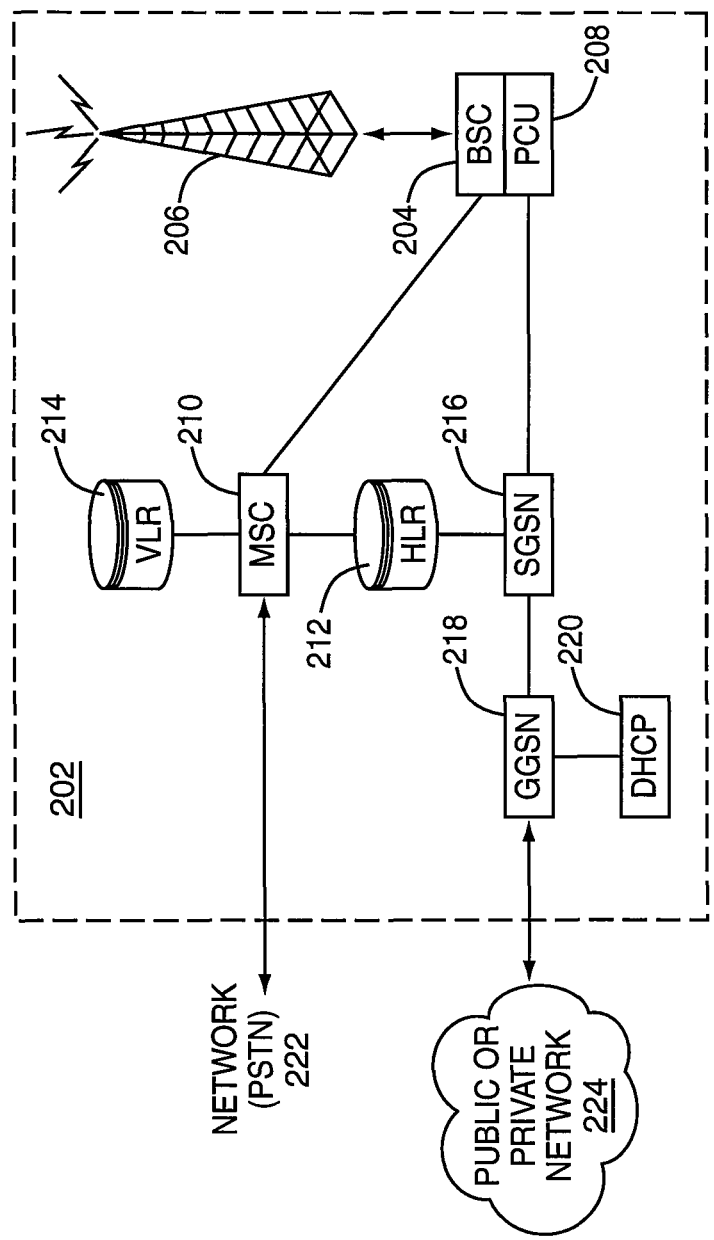
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (POP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
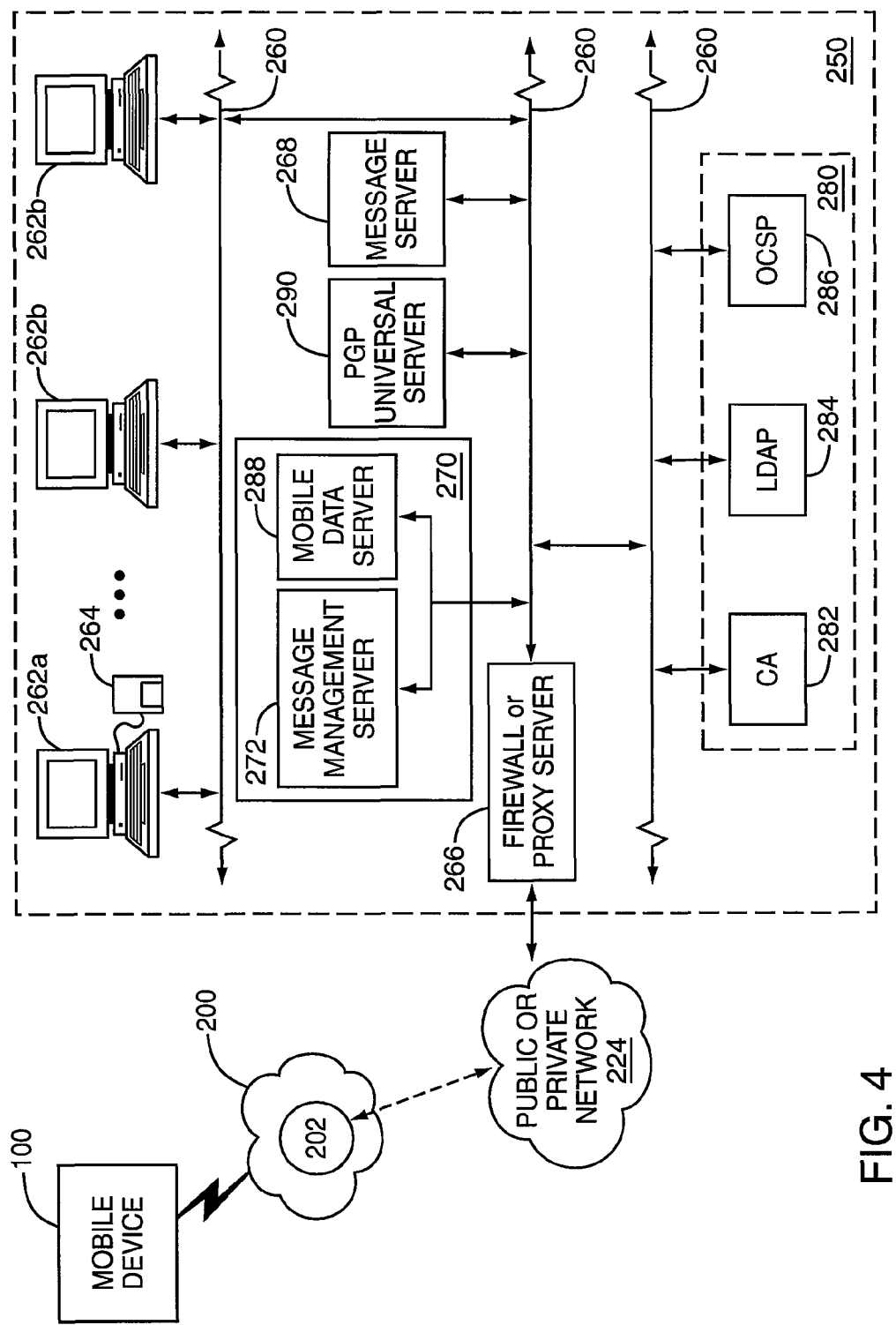
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262*a* with an accompanying cradle 264 for the user's mobile device 100 is situated on LAN 250. Cradle 264 for mobile device 100 may be coupled to computer 262*a* by a serial or a Universal Serial Bus (USB) connection, for example. Other user computers 262*b* are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262*a* to mobile device 100, and may be particularly useful for bulk information updates often performed in initializing mobile device 100 for use. The information downloaded to mobile device 100 may include S/MIME certificates or PGP keys used in the exchange of messages. The process of downloading information from a user's desktop computer 262a to the user's mobile device 100 may also be referred to as synchronization.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

In some embodiments described herein, certificates are used in the processing of encoded messages, such as e-mail messages, that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. In other embodiments described herein, other standards and protocols may be employed to facilitate secure message communication, such as Pretty Good Privacy™ (PGP) and variants of PGP such as OpenPGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate successful decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. In S/MIME, the authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

For the purposes of the specification and in the claims, the term "certificate" is used generally to describe a construct used to provide public keys for encoding and decoding messages and possibly information on the key holder, and may be deemed to include what is generally known as a "PGP key" and other similar constructs.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 is adapted to store public keys (e.g. in S/MIME certificates, PGP keys) of other individuals. Keys stored on a user's computer 262a will typically be downloaded from computer 262a to mobile device 100 through cradle 264, for example.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100). These certificate sources may be private (e.g.

dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be adapted to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

In at least one embodiment, a policy engine 290 resides in LAN 250. In some embodiments of the systems and methods described herein, the policy engine 290 is provided by way of a PGP Universal Server developed by PGP Corporation. This is only one example. In variant embodiments, the policy engine may be implemented in some other device or construct other than a PGP Universal Server, and may be applied in the context of protocols other than PGP (e.g. in an S/MIME policy engine). For example, an Entrust Entelligence Messaging Server (EMS) may be employed.

In this example, a PGP Universal Server 290 is adapted to communicate with a user's desktop computer (e.g. 262a) and the user's mobile device (e.g. 100 via message management server 272), and may be further adapted to encrypt messages and enforce compliance of security requirements with respect to messages being sent by the user, based on policies established by an administrator, for example. The placement of PGP Universal Server 290 in LAN 250 as shown in FIG. 4 is provided by way of example only, and other placements and configurations are possible. Depending on the placement of the PGP Universal Server 290 and the particular configuration of LAN 250 in which PGP Universal Server 290 may be employed, the level of control over processed messages that are subject to security encoding, and in particular, over messages being sent by a user may vary.

For example, PGP Universal Server 290 may be adapted to directly process all outgoing messages (i.e. messages being sent by the user from the user's desktop computer, mobile device, or other computing device to one or more intended recipients), where it will make decisions on which messages to encrypt and/or sign, if at all, in accordance with policies defined on the PGP Universal Server 290 as configured by the administrator. If a policy dictates that a message about to be sent by the user to a particular domain or pertaining to a particular subject is to be encrypted and signed using PGP for example, the PGP Universal Server 290 may itself encrypt and sign the message before transmission.

Alternatively, the user, through a PGP-enabled messaging application on the user's computing device that communicates with PGP Universal Server 290 for example, may download security policy data from the PGP Universal Server 290 to the user's computing device. The user or the application may then be directed to encrypt and sign the message before transmission, based on the security policy data obtained.

Accordingly, PGP Universal Server 290 provides the ability to enforce centralized policy based on domains and other mechanisms.

The PGP Universal Server 290 may also be adapted to store, validate, and otherwise manage PGP keys, and to retrieve PGP keys from remote key stores when the keys are required to encode (e.g. encrypt and/or sign) messages. Where requested by a user or application, PGP Universal Server 290 may also provide stored or retrieved PGP keys to the user as needed.

By adopting the use of a policy engine such as that implemented by a PGP Universal Server 290 as described herein by way of example, much of the burden associated with processing secure messages (e.g. e-mail), and in particular, with deciding what messages are to be sent securely and what security encoding should apply on a case-by-case basis, can be transferred to the policy engine.

As noted previously in this description, embodiments described herein relate generally to systems and methods in which the performance of certain tasks is initiated while a user is composing a message and before a direction is received from the user to send the message. This may involve "pre-fetching" data that will likely be required in order to send a message that is in the process of being composed by the user.

For example, the security policy defined by a policy engine (e.g. such as that implemented in a PGP Universal Server 290 or an EMS not shown in FIG. 4) may be obtained by retrieving security policy data to the computing device while the user on the computing device is composing a message. In particular, as soon as a user begins to compose a new message, security policy data provided by the policy engine may be updated in a background process, for example.

As a further example, once a specific recipient is identified by the user during composition of a message (e.g. by identifying the recipient in one of the "To:", "Cc:", or "Bcc:" fields of the user interface provided by a messaging application), the potential recipient's certificate (which may be a PGP key in some implementations) and the status of the certificate (e.g. from data retrieved from an OCSP server 286 for an S/MIME certificate) may be retrieved in a background process. In some cases, the certificate data and/or certificate status data may be retrievable from a certificate store on the computing device (e.g. a mobile device). In some other cases, the certificate data and/or certificate status may need to be retrieved from a server remote from the computing device.

Initiating the performance of such tasks in advance will generally increase the likelihood that a message will appear to be sent quickly from the user's perspective, as the tasks required to complete the send process might already have been completed, or at the very least, will have already been initiated by the time the direction to send the message is received from the user. By integrating this methodology into a messaging application, such as an e-mail messaging application for example, a more seamless user experience may be provided, particularly where the computing device is a mobile device.

At least some of the steps of the embodiments of a method described herein are performed by an application executing and residing on the computing device. The application may be an e-mail or other messaging application, another application coupled to or otherwise integrated with the e-mail or other messaging application (e.g. an add-on component providing the requisite functionality), or some other application programmed to perform such steps.

The computing device may be a desktop computer (which may, for instance, include a laptop computer or some other computing device that a mobile device may synchronize with), a mobile device, or some other computing device. The computing device may be coupled to a policy engine (e.g. as implemented in a PGP Universal Server 290 of FIG. 4).

Reference is made in the embodiments described below to messages being composed by a user of a computing device. In general, to initiate the process of composing a message, the user is typically first required to select an appropriate icon or menu item provided by a messaging application (e.g. "Compose new message"). If the user wishes to compose a message based on a previously received message (e.g. "Forward message" or "Reply to message"), the user may first need to select the previously received message before selecting the appropriate icon or menu item.

Once the user has finished composing the message, the user may then direct the application to "send" the message (e.g. by selecting a "Send message" button or menu item). In particular, if the message is to be transmitted securely to a recipient, the application will then usually perform further processing of the message (e.g. check the applicable security policy, encrypt the message, etc.) before it is actually sent to the recipient of the message as identified by the user, as described with respect to one embodiment of the method below.

Figure 5A:
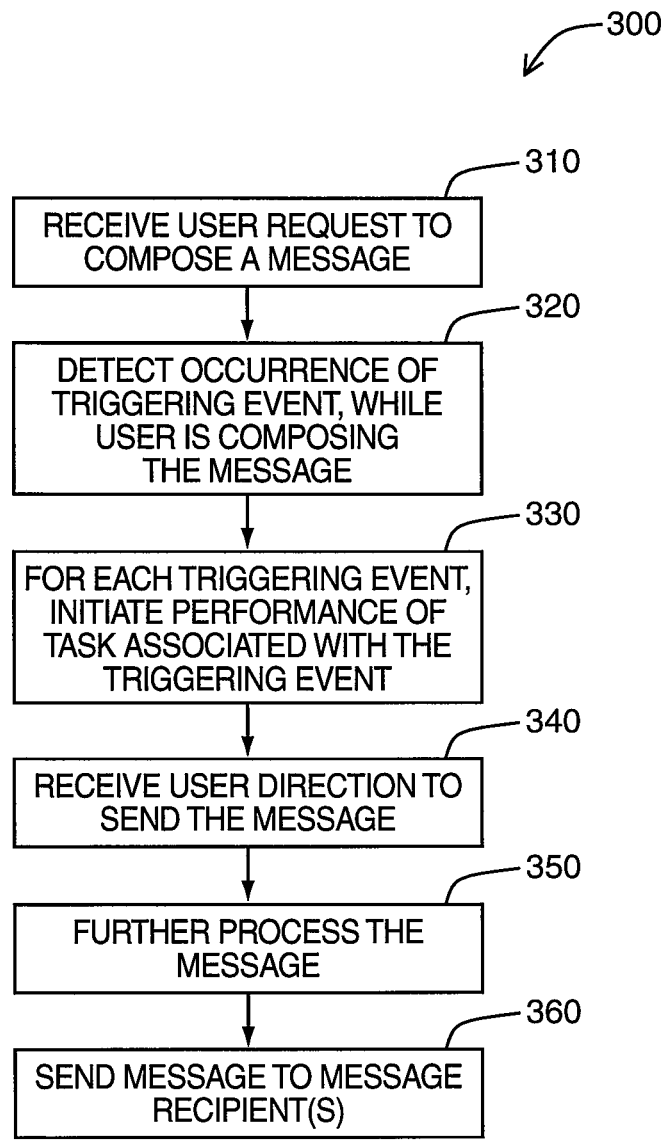
FIG. 5A is a flowchart illustrating steps in a method of processing messages being composed by a user of a mobile device in one example embodiment.

Referring first to FIG. 5A, a flowchart illustrating steps in a method of processing messages being composed by a user of a computing device in one example embodiment is shown generally as 300.

At step 310, a request to compose a message is received from the user.

At step 320, the occurrence of at least one pre-defined triggering event associated with a message being composed by a user on the computing device is detected.

At step 330, for each triggering event that has been detected to have occurred at step 320, the performance of at least one pre-defined task associated with the respective triggering event is initiated while the message is being composed by the user, after detecting the occurrence of the respective triggering event. Preferably, the task(s) associated with the respective triggering event is/are initiated immediately after the occurrence of the event is detected. Accordingly, the task(s) can be initiated while the user is composing the message and before the message is actually directed by the user to be sent.

Each task to be initiated at step 330 will have at least one specific triggering event associated with it. As noted above, multiple tasks may be associated with the same triggering event.

Subsequently, at step 340, a direction from the user to send the message being composed on the computing device is received. The user may provide such direction by pressing a "Send message" button provided by the user interface of the application, or by selecting a corresponding "Send message" menu item, for example.

Alternatively, the user may opt not to send the message by directing the application to cancel or discard the message [steps not shown]. In that case, the remaining steps of method 300 will not be performed.

At step 350, the message to be sent as directed by the user at step 340 is further processed to prepare the message for transmission, where required. For example, the message may be re-formatted for transmission, or checked for compliance with an IT Policy governing the user of the computing device.

At step 360, the message will typically be sent to the message recipient(s) as identified by the user. However, as a result of the further processing performed at step 350, an error or some other condition may be detected, and the application may be adapted to withhold or cancel the sending of the message at step 360.

In another embodiment, the message to be sent by the user is to be transmitted securely to its intended recipients. Accordingly, in this other embodiment, at least some of the tasks that would be initiated at step 330 of method 300 will specifically involve retrieving security-related data, which would be required to further process the message being composed by the user should the user direct the message to be sent. There may be a number of different types of security-related data that could be required, and a different triggering event will be associated with each. This variation of method 300 is described by way of example with reference to FIG. 5B.

Figure 5B:
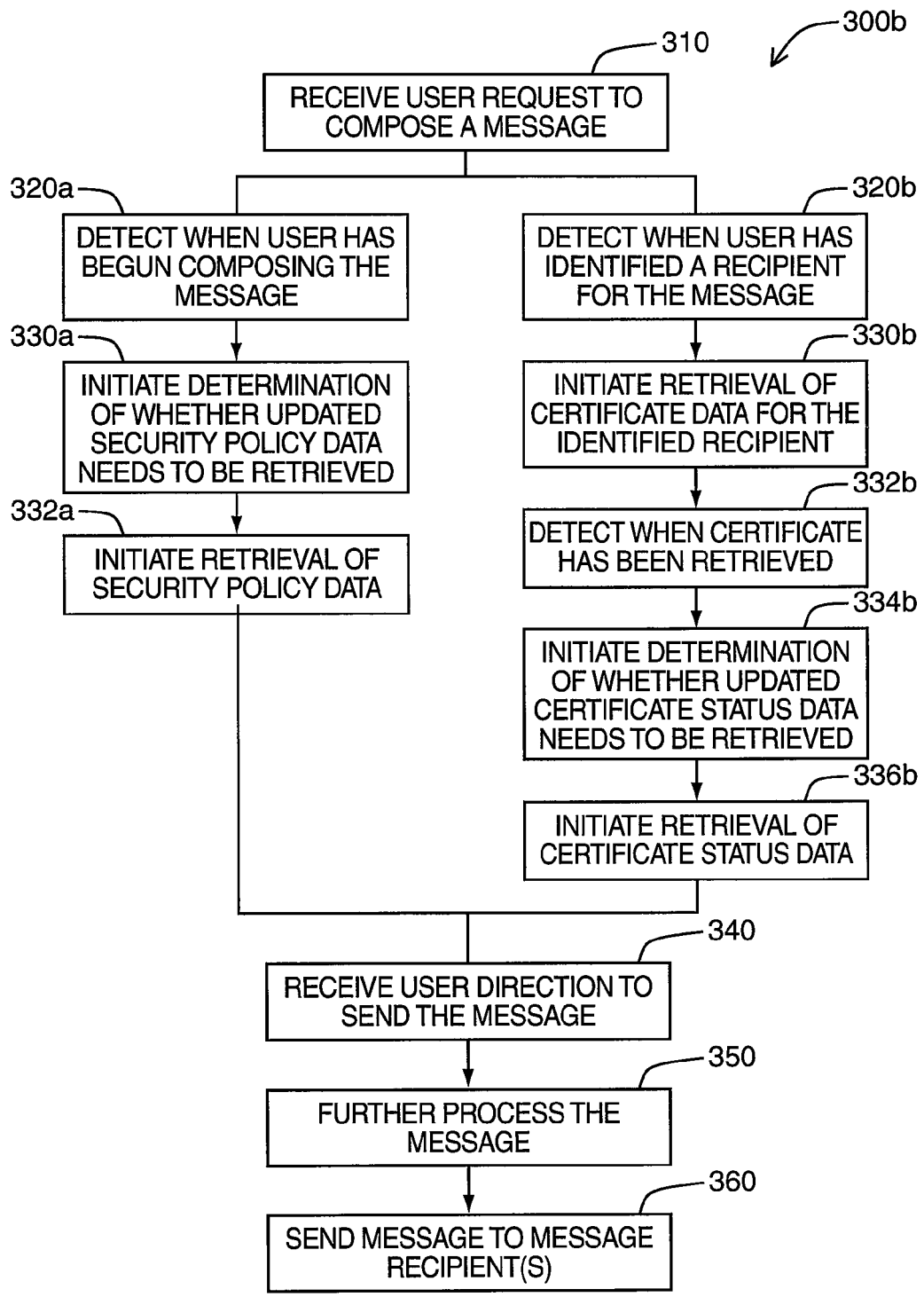
FIG. 5B is a flowchart illustrating steps in a method of processing messages being composed by a user of a mobile device in another example embodiment.

Referring to FIG. 5B, a flowchart illustrating steps in a method of processing messages being composed by a user of a computing device in one example embodiment is shown generally as 300b.

As in method 300, at step 310 of method 300b, a request to compose a message is first received from the user.

The application then monitors the user's composition of the message for various triggering events, as shown at steps 320a and 320b, for example. It will be understood that other triggering events with which other tasks are associated may be monitored in variant embodiments.

For instance, at step 320a, the application detects when the user has begun composing the message. The user may be considered to have begun composing the message when, for example, the appropriate icon or menu item is selected (e.g. "Compose new message", "Forward message", "Reply to message"), when a window for entering text in the message to be composed appears, when text is actually entered in the window or when a document is attached to the message by the user, or upon some other action as may be defined for a particular implementation.

At step 330a, a determination of whether updated security policy data needs to be retrieved from a policy engine (e.g. as implemented in a PGP Universal Server, EMS, or some other policy engine or server which dictates and/or enforces specific encodings for messages being sent by a user) is initiated. This may require checking any security policy data that is already stored on the computing device (e.g. the mobile device) and determining whether that data is stale and requires updating. The length of time that such data may exist on the computing device before becoming stale may be determined by an IT Policy or other security policy or device configuration, for example.

The determination made at step 330a is initiated upon detecting that the user has begun composing the message at step 320a, which would be the triggering event associated with the specific task of determining whether updated security policy data needs to be retrieved. However, a different triggering event may be associated with this specific task in variant embodiments.

Subsequently, at step 332a, the retrieval of security policy data from the policy engine is initiated if it is determined at step 330a that updated security policy data needs to be retrieved from the policy engine.

The flow of method steps continues at step 340. It will be understood that the tasks initiated at steps 330a and/or 332a may or may not be completed by the time a user direction to send the message is received at step 340.

In a variant embodiment, step 330a may not be performed, and security policy data may be retrieved from the policy engine at step 332a automatically upon detecting that the user has begun composing the message at step 320a (or upon the occurrence of some other associated triggering event). This may be desirable if the most recent security policy data is to be retrieved every time a new message is being composed, regardless of when security policy data was last retrieved to the computing device, for example.

Although there is a risk that the message being composed may ultimately not be sent, and therefore, the security policy data on the computing device may have been updated or retrieved unnecessarily, a trade-off is made when steps 330a and/or 332a are performed. If the message composed is actually sent, then some, if not all of the time required to update or retrieve the security policy data (which might otherwise be spent only after the user directs the message to be sent) can be spent in advance, thereby making the send process appear to be more seamless from the user's perspective.

Meanwhile, at step 320b, the application detects when the user has identified a recipient to which the message being composed is intended to be sent. The user may be considered to have identified a message recipient by, for example, identifying the recipient in one of the "To:", "Cc:", or "Bcc:" fields of the user interface provided by a messaging application, or upon some other action as may be defined for a particular implementation.

At step 330b, retrieval of certificate data from a certificate store is initiated upon detecting that the user has identified a message recipient while composing the message at step 320b, which is the triggering event associated with the specific task of retrieving certificate data for the particular message recipient. However, other triggering events may be associated with this specific task in variant embodiments.

The certificate data may be an S/MIME certificate, or a PGP key, for example. The certificate store may reside on the computing device, or it may reside on a server remote from the computing device (e.g. LDAP server 284 of FIG. 4) from which the certificate data must be requested.

The retrieval of certificate data initiated at step 330b will typically be associated with a certificate issued to an individual or entity, and in particular, the message recipient identified by the user. If the message recipient is an alias for multiple individual recipients (e.g. identified by a mailing list or distribution list address), retrieval of a certificate for each of the individual recipients may be initiated at step 330b.

It will be understood that that the retrieval of certificate data initiated at step 330b for a particular individual may not always be successful, as not all individuals may have been issued a certificate, for example.

Although there is a risk that the message being composed may ultimately not be sent, and therefore, certificates for potential message recipients may have been retrieved unnecessarily, a trade-off is made when step 330b is performed. If the message composed is actually sent, then some, if not all of the time required to retrieve the requisite certificate(s) (which might otherwise be spent only after the user directs the message to be sent) can be spent in advance, thereby making the send process appear to be more seamless from the user's perspective.

Steps 332b to 336b as described below may be performed where the certificate data being retrieved as a result of step 330b being performed is provided in a certificate for which certificate status can be verified.

At step 332b, the application detects when the certificate data for the identified message recipient has been retrieved to the computing device as initiated at step 330b.

At step 334b, a determination of whether updated certificate status data needs to be retrieved (e.g. from OCSP server 286 of FIG. 4) for the retrieved certificate is initiated. This may require checking a record of when a certificate retrieved as a result of step 330b being performed was last verified for revocation status, for example. The length of time that status data may exist on the computing device before becoming stale may be determined by an IT Policy or other security policy or device configuration, for example.

Subsequently, at step 336b, retrieval of certificate status data (e.g. revocation status) for one or more certificates is initiated if it is determined at step 334b that updated certificate status data needs to be retrieved.

The flow of method steps continues at step 340. It will be understood that the tasks initiated at steps 330b, 334b and/or 336b may or may not be completed by the time a user direction to send the message is received at step 340.

In a variant embodiment, step 334b may not be performed, and retrieval of certificate status data may be initiated at step 336b automatically upon detecting that the certificate for a message recipient has been retrieved as a result of step 330b being performed, or after detecting that some other triggering event has occurred. This may be desirable if the most recent certificate status data is to be retrieved every time a certificate is retrieved for use, regardless of when the revocation status for the certificate was last verified, for example.

Although there is a risk that the message being composed may ultimately not be sent, and therefore, the certificate status data for one or more certificates may have been updated or retrieved unnecessarily, a trade-off is made when steps 334b and/or 336b are performed. If the message composed is actually sent, then some, if not all of the time required to update or retrieve the certificate status data (which might otherwise be spent only after the user directs the message to be sent) can be spent in advance, thereby making the send process appear to be more seamless from the user's perspective.

Certificate status data for which retrieval is initiated at step 336b may include certificate-related data other than that used to verify revocation status. For example, retrieval of data used to verify the trust status, the validity (e.g. expiry), or key strength of a certificate retrieved as a result of step 330b being performed may also be initiated at this step.

In this example embodiment, the data that is "pre-fetched" while a message is being composed by the user includes security policy data, certificate data, and certificate status data. Retrieval of a subset of this data, additional data and/or different data may be initiated in variant embodiments, and the retrieval of particular data may be associated with one or more different triggering events.

It will be understood that additional instances of steps 320b and 330b, as well as instances of steps 332b to 336b at which the status of certificates can be verified, may be repeated and executed concurrently in order to initiate the retrieval of certificate data and optionally certificate status data for multiple message recipients, where multiple message recipients are identified for the same message by the user. Similarly, instances of steps 320b to 336b and steps 320a to 332a may be executed concurrently in parallel background processes. Other triggering events may be monitored, and their associated tasks may also be initiated concurrently in parallel background processes.

At step 340, a direction from the user to send the message being composed on the computing device is received. The user may provide such direction by pressing a "Send message" button provided on the user interface of the application, or by selecting a corresponding "Send message" menu item, for example. Alternatively, the user may opt not to send the message by directing the application to cancel or discard the message [steps not shown]. In that case, the remaining steps of method 300b will not be performed.

At step 350, the message to be sent as directed by the user at step 340 is further processed to prepare the message for transmission, where required. For example, the message may be re-formatted for transmission, or checked for compliance with an IT Policy.

At this step, the message may be further processed using the data that has been retrieved at previous steps of method 300b. For example, the security policy data retrieved as a result of step 332a being performed may be used to determine the specific security encoding that is to be applied to the message before transmission. The certificate data retrieved as a result of step 330b being performed may be used to encode the message for transmission, and the certificate status data retrieved as a result of step 336b being performed may be used to verify the status of the certificate before it is permitted for use in encoding the message for transmission.

Additional input from the user may also be required in the further processing of the message at step 350. For example, if there is a problem with the status of a certificate or if a certificate for a particular recipient is not found, the user may be prompted to confirm whether the message should still be sent. If multiple certificates that are potentially associated with an identified recipient have been retrieved, the user may be required to select the appropriate certificate. If the user has selected a particular encoding for the message but the selected encoding does not comply with security policy data retrieved, the user may be prompted to confirm whether the message should still be sent.

These are examples only, and other tasks may be performed in the further processing of the message at step 350 in variant embodiments.

At step 360, the message will typically be sent to the message recipient(s) as identified by the user. However, as a result of the further processing performed at step 350, an error or some other condition may be detected, and the application may be adapted to withhold or cancel the sending of the message at step 360.

The steps of the methods described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A computing device configured to:
identify a triggering event that has occurred during composition of a message; and
retrieve certificate status data, wherein the certificate status data is used to verify the status of a certificate associated with a message recipient of the message;
wherein the computing device is configured to initiate retrieving the certificate status data after the triggering event has occurred and before a user direction to send the message is received.

2. The device of claim 1, wherein the triggering event is identified in response to a detection that a recipient for the message is identified.

3. The device of claim 1, wherein the triggering event is identified in response to a user selection of an icon or menu item made to initiate composition of the message.

4. The device of claim 1, wherein the triggering event is identified in response to a window for entering text in the message appearing in a screen of the computing device.

5. The device of claim 1, wherein the triggering event is identified in response to text being first entered, during composition of the message, into a window appearing in a screen of the computing device.

6. The device of claim 1, wherein the triggering event is identified in response to a document being attached to the message during composition of the message.

7. The device of claim 1, wherein the computing device is further configured to process the message using the certificate.

8. The device of claim 1, wherein the computing device is further configured to receive the user direction to send the message, and to send the message to the message recipient.

9. The device of claim 1, wherein the computing device is further configured to retrieve the certificate associated with the message recipient from a certificate store.

10. The device of claim 9, wherein the certificate store resides on a server remote from the computing device, or on the computing device.

11. A method, performed at a computing device, comprising:
identifying a triggering event that has occurred during composition of a message; and
retrieving certificate status data, wherein the certificate status data is used to verify the status of a certificate associated with a message recipient of the message;
wherein the retrieving is initiated after the triggering event has occurred and before a user direction to send the message is received.

12. The method of claim 11, wherein the triggering event is identified in response to a detection that a recipient for the message is identified.

13. The method of claim 11, wherein the triggering event is identified in response to a user selection of an icon or menu item made to initiate composition of the message.

14. The method of claim 11, wherein the triggering event is identified in response to a window for entering text in the message appearing in a screen of the computing device.

15. The method of claim 11, wherein the triggering event is identified in response to text being first entered, during composition of the message, into a window appearing in a screen of the computing device.

16. The method of claim 11, wherein the triggering event is identified in response to a document being attached to the message during composition of the message.

17. The method of claim 11, further comprising processing the message using the certificate.

18. The method of claim 11, further comprising receiving the user direction to send the message, and sending the message to the message recipient.

19. The method of claim 11, further comprising retrieving the certificate associated with the message recipient from a certificate store.

20. The method of claim 19, wherein the certificate store resides on a server remote from the computing device, or on the computing device.

21. A non-transitory computer-readable medium, comprising instructions, executable by a computing device, for performing acts comprising:

identifying a triggering event that has occurred during composition of a message; and retrieving certificate status data, wherein the certificate status data is used to verify the status of a certificate associated with a message recipient of the message;

wherein the retrieving is initiated after the triggering event has occurred and before a user direction to send the message is received.

22. The medium of claim 21, wherein the triggering event is identified in response to a detection that a recipient for the message is identified.

23. The medium of claim 21, wherein the triggering event is identified in response to a user selection of an icon or menu item made to initiate composition of the message.

24. The medium of claim 21, wherein the triggering event is identified in response to a window for entering text in the message appearing in a screen of the computing device.

25. The medium of claim 21, wherein the triggering event is identified in response to text being first entered, during composition of the message, into a window appearing in a screen of the computing device.

26. The medium of claim 21, wherein the triggering event is identified in response to a document being attached to the message during composition of the message.

27. The medium of claim 21, the acts further comprising processing the message using the certificate.

28. The medium of claim 21, the acts further comprising receiving the user direction to send the message, and sending the message to the message recipient.

29. The medium of claim 21, the acts further comprising retrieving the certificate associated with the message recipient from a certificate store.

30. The medium of claim 29, wherein the certificate store resides on a server remote from the computing device, or on the computing device.

* * * * *